they are all around 2,976,301

MITICIDAL AGENT

Max W. Miller, North Stonington, Conn., assignor to Chas. Pfizer & Co., Inc., Brooklyn, N.Y., a corporation of Delaware No Drawing. Filed Dec. 16, 1958, Ser. No. 780,674

4 Claims. (Cl. 260—348)

This invention is concerned with a new pesticide valuable in combatting insects and particularly useful as an acaricidal agent (miticidal agent).

The wide-spread and effective use of insecticides has given rise to a new problem, that is, the control of mites. The removal of insects, particularly of insects which are the natural enemies of mites, has progressed to the point where various species of mites formerly considered serious pests only occasionally, or in restricted areas, have caused grave injury each season to many economically important crops. The compound of this invention is unusually effective in the control of mites.

The compound of the present invention is L-trans epoxysuccinonitrile which may be represented by the following formula:

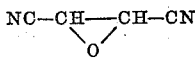

It has been surprisingly found that this compound may be prepared from L-trans epoxysuccinamide by a novel dehydration reaction. This is indeed surprising since it is found that the corresponding racemic compound, D,L-trans epoxysuccinamide, does not dehydrate to the corresponding nitrile. Of a larger number of chemical agents employed for the dehydration of amides to nitriles, for example, phosphorus pentoxide, phosphorus pentachloride, p. toluenesulfonyl chloride, ammonium sulfate, concentrated sulfuric acid, thionyl chloride, only phosphorus oxychloride produces appreciable quantities of the instant compound from the corresponding amides. It is further unexpected that the compound of the present invention may be prepared by employing phosphorus oxychloride since it is expected that the reagent would first attack the epoxide linkage of the substrate before effecting the desired dehydration reaction. The reaction is effected only under specified conditions as hereinafter described. The preparation of D,L-trans epoxysuccinamide is described in the literature, for example, Lossen, Annalen 348, 304.

L-trans epoxysuccinamide may be prepared from L-trans epoxysuccinic acid lower alkyl diesters by treatment with concentrated ammonium hydroxide at a temperature of from about 0° to about 15° C. The reaction is found to be almost instantaneous, the selected diester dissolves in the reagent and the desired new product, i.e. L-trans epoxysuccinamide, separates almost simultaneously. The product is obtained by conventional means, for example, filtration of the reaction mixture, and then purified by recrystallization.

L-trans epoxysuccinic acid diesters may be prepared according to the procedure described in copending application, Serial Number 695,502, filed November 12, 1957, wherein is described the preparation of the above diesters from L-trans epoxysuccinic acid or its alkaline earth metal salts by treatment with the desired lower alkanol in the presence of catalytic or equivalent amounts of sulfuric acid respectively. L-trans epoxysuccinic acid may be produced by fermentation processes as described in U.S. Patent 2,674,561.

The process for the preparation of L-trans epoxysuccinonitrile may be effected by heating a mixture of L-trans epoxysuccinamide and phosphorus oxychloride at a temperature of from about 75° to about 100° C. but preferably from 78° to 84° C. The time of reaction may vary somewhat, usually best results being obtained when the mixture is heated for from about 30 to about 60 minutes. Shorter or longer reaction time may result in decreased yield of the product. One mole of phosphorus oxychloride is theoretically required to dehydrate epoxysuccinamide. For best yields, a large molar excess of the dehydrating agent should be employed, for example, from about 200% to about 900% molar excess. The use of larger excesses provides no appreciable advantage. The excess of phosphorus oxychloride serves as solvent for the reaction permitting a more intimate contact of the reagent with the subtrate. Vigorous agitation of the reaction mixture is also found helpful although not essential. The use of a substantially dry inert atmosphere, for example, substantially dry nitrogen gas, while not essential, is also found particularly helpful. During the course of heating the evolution of gas is noted. After heating is complete, the product may be recovered by quenching the reaction mixture by cooling rapidly to about 5° C. with continued agitation. The crystalline product, i.e. L-trans epoxysuccinonitrile, separates as the mixture cools and is obtained by standard methods. One such method involves the rapid filtration of the reaction mixture through a coarse sintered glass funnel followed immediately by successive washing with hexane and ice water, in that order. The crude nitrile so obtained may be purified by standard procedures, for example, sublimation at reduced pressure or recrystallized from suitable solvents, for example, lower alkanols. If desired, the mother liquor from the original filtration may be concentrated to obtain further product employing the same procedure.

As an example of the particular effectiveness of the present compound against mites, the miticidal action against *Tetranychus telarious*—Harvey, commonly known as the two-spotted spider mite, may be cited. This particular mite causes extensive damage in both hot houses and open air crops. It is a general feeder but is particularly troublesome with such crops as cucumbers, tomatoes, rose, chrysanthemums, fuchsias and ageratums. It is a major problem on roses. When it is not controlled it limits production of edible crops and makes flowers unsalable. It has become increasingly prevalent in orchards and particularly in those areas which have been extensively treated with common insecticides.

The agent of this invention was utilized in standard miticidal tests gainst the two-spotted spider mite. It has been found that at a concentration of 350 parts per million in an aqueous emulsion, the percentage of kills obtained is 100%. With lower concentration of the present agent, a lower percentage of kills may be realized.

Mites present a peculiar control problem. Their life cycle is so short that there is nearly always a sufficiently high proportion of the population in the egg stage to render miticides which are effective only against the nymph or adult stage of the mite ineffective. Thus, a miticide which is effective only against the nymph and adult mite does not give complete control since the eggs which have not yet hatched might very well hatch and mature after the miticide has disappeared from the plant. It is a particular attribute of this invention that the compound is effective against all stages of the mite life cycle including the egg.

In a test employing the two-spotted spider mite in which plants were sprayed with an aqueous emulation containing 350 parts per million of L-trans epoxysuccinonitrile, a count was made of the number of mites per leaf seven days after the initial spraying. It was found that the average number of mites per leaf was under two. Since under the conditions of the test the eggs would normally have hatched within the seven day period and since each female mite lays a total of from one hundred to one hundred and ninety-four eggs during its life, it is obvious that this compound is effective in destroying the eggs.

Although the active agent of this invention can be used alone, it is more economical to use it in a dispersed form in a suitable extending agent.

In this disclosure the term, "dispersed" is used in its widest possible sense. To say that the compound of this invention is dispersed is meant that the particles may be molecular in size and held in true solution in a suitable solvent. Further it is meant that the particles may be colloidal in size and dispersed through a liquid phase in the form of suspensions or emulsions or in the form of particles held in suspension by wetting agents. Also included are particles which are dispersed in a semi-solid viscous carrier such as Vaseline or soap in which case they may be actually dissolved in the carrier or held in suspension in the carrier with the aid of suitable emulsifying or wetting agents. By the term, "dispersed" is also meant that the particles may be mixed with and spread throughout a solid carrier so that the mixture is in the form of powder or dust. Also included in the term, "dispersed" are mixtures which are suitable for use as aerosols such as a solution, suspension or emulsion of the agent of our invention in a carrier such as the Freon type which boils below room temperature at ordinary pressure, for example, Freon-11 (trichloromonofluoromethane), Freon-12 (dichlorodifluoromethane), Freon-22 (monochlorodifluoromethane), Freon-113 (trichlorotrifluoroethane) or Freon-114 (dichlorotetrafluoroethane).

The term, "extending agent" as used herein includes any and all of those agents in which the compound of this invention is dispersed. It includes, therefore, the solvents of a true solution, the liquid phase of suspensions, emulsions or aerosols, the semi-solid carrier of ointments and the solid phase of dust and powders.

It has been found that the compound of the present invention is active when it is dispersed in an extending agent at a concentration of 0.035 percent by weight. This concentration is effective when the dispersing agent is a liquid but it is preferred to use more concentrated mixtures when the dispersing agent is a semi-solid or a solid. This is because liquid dispersions which are, of course, suitable for use as sprays, give a more intimate contact with the mites than the solid dispersions and, therefore, lower concentrations are more effective with liquid dispersions.

There are a number of solvents which can be utilized for the preparation of solutions, suspensions or emulsions of the compound of this invention. High boiling oils of vegetable origin such as castor oil or olive oil are found to be suitable. Low boiling more volatile solvents such as acetone, cyclohexanone, carbon tetrachloride, ethylene-dichloride, tetrachloroethane, hydrogenated naphthalenes and the like are also found to be useful. Purified, solvent-extracted petroleum fractions are especially useful. For certain applications it may be advantageous to resort to mixtures of solvents.

If the active agent is to be applied as an aerosol it is convenient to dissolve it in a suitable solvent and to disperse the resulting solution in a liquid such as Freon which boils below room temperature. For such application it is found better to employ true solutions of the active agent although it is possible to employ suspensions or emulsions of the active agent.

The agent of this invention is often dispersed either in the form of emulsions or suspensions, in an inert carrier such as water with the aid of a capillary active substance. Such capillary substances may be anion-active, cation-active or non-ionizing. There may be mentioned by way of example natural of synthetic soaps, Turkey-red oil, fatty alcohol sulfonates, esters of fatty acids and the like. Other examples include high molecular weight quaternary ammonium compounds as well as condensation products of ethylene and propylene oxide with monohydric and polyhydric alhocols.

For use as a powder or dust the active ingredient of this invention is mixed with any of a number of extending agents either organic or inorganic in nature which are suitable for the manufacture of pulverulent preparations. This includes, for example, tricalcium phosphate, calcium carbonate, kaolin, bole, kieselguhr, talcum, calcined magnesia, boric acid and others. Materials of vegetable origin such as powdered cork, powdered wood and powdered walnut shells are also useful. These mixtures may be used in the dry form, or by the addition of wetting agents, the dry powder can be rendered wettable by water so as to obtain stable aqueous dispersions suitable for use as sprays.

For special purposes the agent of this invention may be worked into the form of a paste or an ointment by the use of such semi-solid extending agents as soap, lanolin or Vaseline with or without the aid of solubility promoters and/or dispersing agents.

In all of the forms described above the dispersions may be provided ready for use or they may be provided in a concentrated form suitable for mixing with other extending agents before use.

The compound of the present invention is also found to have considerable antiphytopathogenic activity.

This application is a continuation-in-part of copending application Serial Number 712,068, filed January 30, 1958, and now abandoned.

The following examples are given by way of illustration and are not to be construed as limitations of this invention many variations of which are possible without departing from the scope and spirit thereof.

*Example I*

A mixture containing 35 mg. of L-trans epoxysuccinonitrile, one hundred grams of pulverized calcium carbonate, two grams of olein and one gram of slaked lime is ground in a ball mill. The resulting powder is easily scattered, has good adhesive powder and is effective against mites.

*Example II*

A mixture of 15 mg. of L-trans epoxysuccinonitrile, twenty-five g. of talcum, four g. of sodium dibutylnaphthalene sulfonate, four g. of casein and five g. of sodium carbonate are ground in a ball mill. The mixture is added to an equal quantity of ground calcium carbonate and the whole thoroughly mixed. This powder may be suspended in water immediately before use and gives a miticidal suspension which is sufficiently stable for use in spraying applications.

*Example III*

A solution is prepared containing 35 mg. of L-trans epoxysuccinonitrile in one hundred g. of carbon tetrachloride. The solution is useful as an insecticide in spraying applications.

*Example IV*

A mixture is prepared containing 35 mg. of L-trans epoxysuccinonitrile; twenty grams of xylene and eighty grams of Turkey-red oil. This solution can be readily emulsified in water and the pesticidal emulsion is suitable as a spray.

*Example V*

A suspension of one hundred g. of finely powdered calcium carbonate in an acetone solution containing 35 mg. of L-trans epoxysucininonitrile is prepared and the acetone evaporated in vacuo. The resulting powder is easily scattered and is effective against mites.

*Example VI*

A solution containing 70 mg. of L-trans epoxysuccinonitrile, forty g. of acetone and one hundred and sixty g. of Freon is prepared and used as a pesticidal agent in an aerosol bomb.

*Example VII*

A mixture was prepared containing 0.035% of L-trans epoxysuccinonitrile in water to which was added 0.1% by volume of Tween 80, a mixture of polyoxyethylene ethers of mixed partial oleic esters of sorbitol anhydrides (Atlas Powder Corp.). The mixture is useful as a foliar spray.

*Example VIII*

A 100 ml. round-bottomed flask fitted with Hershberg stirrer, thermometer, nitrogen source and Drierite-protected condenser was charged with about 43 g. (0.28 mole) phosphorus oxychloride and 5.4 g. (0.04 mole) of dry L-trans epoxysuccinamide. The mixture was heated at 75° C. for 60 minutes after which the mixture was cooled to 5° C. The crystalline product was rapidly filtered through a sintered glass funnel and washed with 3–15 ml. portions of hexane followed with 3–15 ml. portion of ice water. The excess phosphorus oxychloride was stirred at aspirator pressure from the mother liquors. As the solution became concentrated additional epoxysuccinonitrile separated. It was removed by filtration, washed as above and the combined crops purified by sublimation at 85° C. (0.1 mm.). The purified material weighed 1.5 g., thick, white crystals, M.P. 130–130.5°.

Elemental analysis gave the following results: Calcd. for $C_4H_2N_2O$: C, 51.06; H, 2.14; N, 29.78. Found: C, 51.10; H, 1.92; N, 29.29.

*Example IX*

A mixture of 10 g. (0.077 mole) of L-trans epoxysuccinamide and 100 g. (0.65 mole) of phosphorus oxychloride under a slow stream of dry nitrogen gas was vigorously stirred and heated at 78°–84° C. for 60 minutes. The white suspension dissolved and the evolution of gas continued until the reaction was stopped. The reaction mixture was quenched by cooling rapidly to 5° C. with continued stirring. The reaction mixture was protected from atmospheric moisture during the above procedure, by a calcium chloride drying tube. The product separated as the mixture was cooled and was obtained as described in Example VIII. 3.1 g. of L-trans epoxysuccinonitrile was obtained in this fashion.

*Example X*

The procedure of Example VIII was repeated employing 23 g. (0.15 mole) in place of 100 g. of phosphorus oxychloride for a time period of 30 minutes, at a temperature of 100° C. with comparable results.

*Example XI*

A mixture of 10 g. (0.077 mole) of L-trans epoxysuccinamide and 100 g. (0.65 mole) of phosphorus oxychloride was vigorously stirred and heated at 78°–84° C. for 60 minutes. The white suspension dissolved and evolution of gas continued until the reaction was stopped. The reaction mixture was quenched by cooling rapidly to 5° C. with continued stirring. The product separated as the mixture cooled and a 53% yield of L-trans epoxysuccinonitrile was obtained by filtration, successive washing with 3–15 ml. portions of hexane and 3–15 ml. portions of water and sublimation at 85° C. (0.1 mm.).

*Example XII*

A mixture of 5.4 g. (0.04 mole) of DL-trans epoxysuccinamide and 43 g. (0.28 mole) of phosphorus oxychloride was treated as described in Example VIII. The original D,L-trans epoxysuccinamide was recovered unchanged.

*Example XIII*

A mixture of 70 g. of methyl L-trans epoxysuccinate was stirred with 200 ml. of concentrated ammonium hydroxide in an open flask for 15 minutes. As the ester dissolved, the product separated. The product was then removed by filtration and washed with cold water. 60 g. of L-trans epoxysuccinamide was obtained. Recrystallization of the product from water gave a pure sample, m. 205–208° C. (dec.).

Elemental analysis gave the following results: Calcd. for $C_4H_6N_2O_3$: C, 36.92; H, 4.65; N, 21.54; O, 36.89. Found: C, 36.67; H, 4.40; N, 21.59.

This procedure is repeated employing ethyl, n-propyl and isopropyl L-trans epoxysuccinate in place of the methyl ester with comparable results.

What is claimed is:

1. L-trans epoxysuccinonitrile.

2. A process for the preparation of L-trans epoxysuccinonitrile which process comprises heating L-trans epoxysuccinamide with from about 200% to about 900% molar excess of phosphorus oxychloride at a temperature of from about 75° to about 100° C. for from about 30 to about 60 minutes.

3. A process as claimed in claim 2 wherein the temperature employed is from about 78° to about 84° C.

4. A process as claimed in claim 2 wherein the reaction is carried out in the presence of a substantially dry inert atmosphere.

References Cited in the file of this patent

Lossen: Annalen, 348 (1906), page 304.

Karrer: Organic Chemistry, 1938, pages 92 and 93.

Karrer: Organic Chemistry, 2nd ed., pp. 92–102 (1946).